Figure 7:
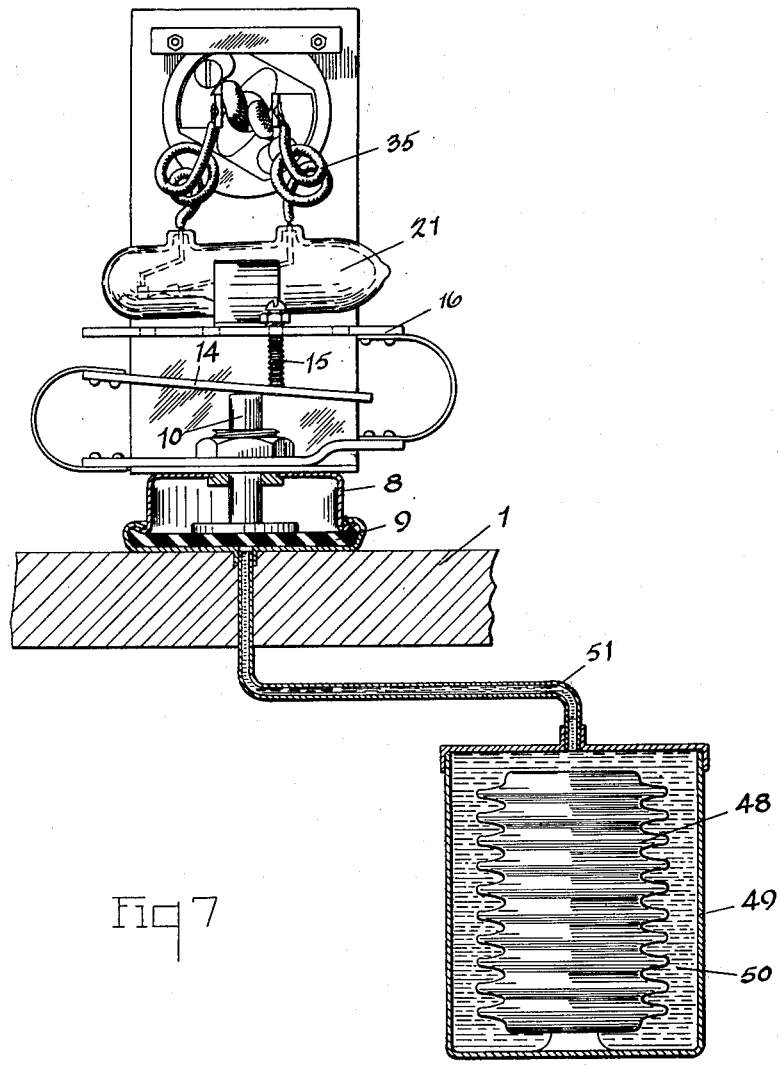

July 9, 1929.  E. C. RANEY  1,719,851
THERMOSTATIC SWITCH
Filed Sept. 25, 1926   3 Sheets-Sheet 1
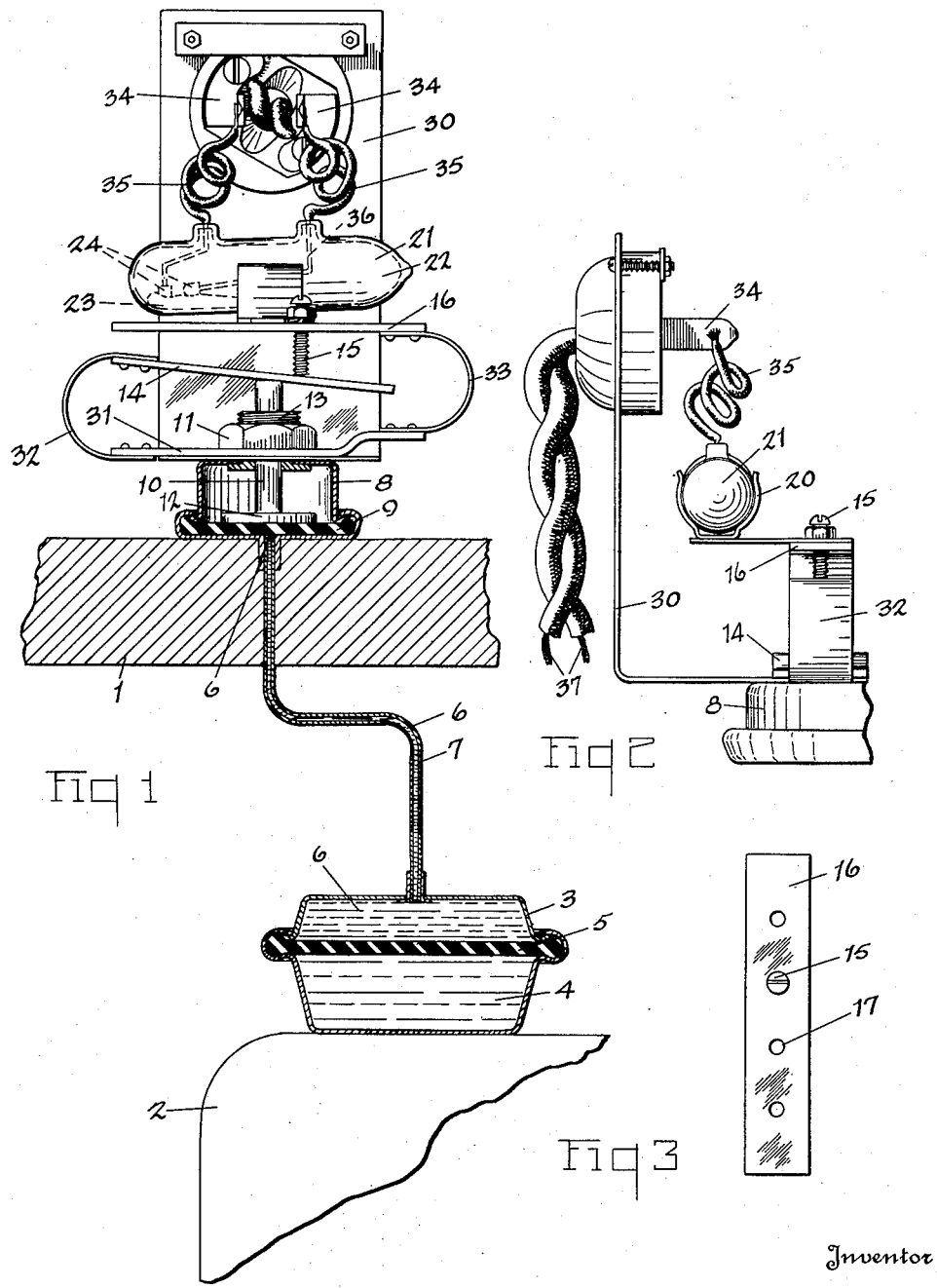
Inventor
Eskel C. Raney
By Faust F. Crampton
Attorney July 9, 1929. E. C. RANEY 1,719,851
THERMOSTATIC SWITCH
Filed Sept. 25, 1926 3 Sheets-Sheet 2
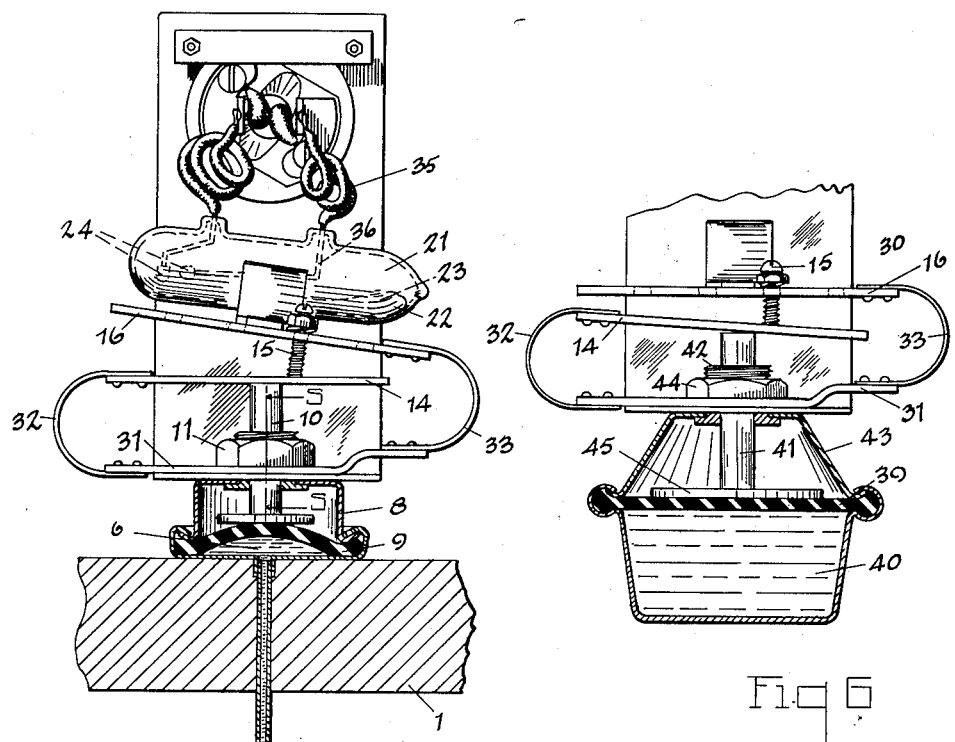
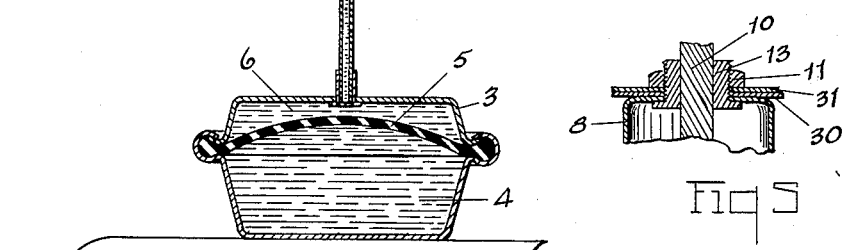
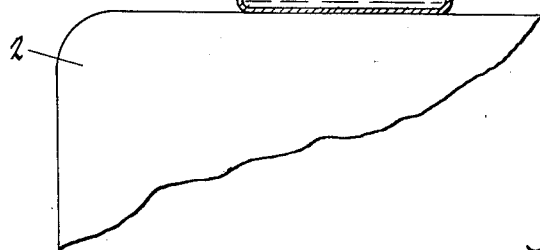
Inventor
Estel C. Raney
By Faust F. Crampton
Attorney July 9, 1929. E. C. RANEY 1,719,851
THERMOSTATIC SWITCH
Filed Sept. 25, 1926 3 Sheets-Sheet 3

Inventor
Eskel C. Raney
By Faust F. Crampton
Attorney

Patented July 9, 1929.

1,719,851

UNITED STATES PATENT OFFICE.

ESTEL C. RANEY, OF COLUMBUS, OHIO.

THERMOSTATIC SWITCH.

Application filed September 25, 1926. Serial No. 137,645.

My invention has for its object to provide an efficient electrothermic switch which will respond accurately and will be operated with certainty when the temperature decreases to a pre-determined point. The invention particularly has for its object to provide means whereby a liquid will be hydrostatically moved in response to the expansion of a thermic member and, if desired, a magnified movement caused by the pressure, may be transmitted to a point remote from the thermic body and yet at a very high pressure. A further particular object is to translate the movement produced by the expansion of the thermic body to a point remote from the thermic body and cause a positive, as distinct from a yielding movement of the member. A further object of the invention is to provide a means which is practically non-affected by the changes of temperature to which the thermic body is subjected and yet which will transmit the pressure and movement created by the expansion of the thermic body and wherein the said movement in its translation through the said means may be magnified as desired.

The invention is particularly applicable to devices for modifying or maintaining thermic conditions within a chamber and the means embodying my invention has for its object to control the devices in their operations. Thus, my invention is advantageously used in connection with refrigerating machines and similar devices for controlling the temperature of the refrigerant, and consequently for controlling the chambers or articles or parts of the machine whose temperature is modified or maintained by the refrigerant.

The invention may be contained in thermic devices of different forms for maintaining any desired high or low temperature and to illustrate a practical application of the invention I have selected three forms of thermic switches that contain my invention as examples of the various embodiments of my invention and shall describe them hereinafter. The thermic switches selected are shown in the accompanying drawings.

Figure 1 illustrates a side view of one of the thermic switches selected for purposes of illustration a part of which is shown in section. Fig. 2 is a side view of a part of the device shown in Fig. 1. Fig. 3 illustrates an adjusting bar for adjusting the degree of responsive movement of the switch. Fig. 4 illustrates the thermic switch when the parts have changed in their relative positions by the expansion of the thermic element when the temperature has been lowered to a predetermined point. Fig. 5 illustrates a section taken on the plane of the line 5—5 indicated in Fig. 4. Fig. 6 illustrates a side view of a modified form of switch, a part of which is shown in section. Fig. 7 illustrates a further modified form of the thermic switch, a part being shown in section.

The thermic switches embodying my invention consists of two interrelated parts, one the thermic member and the other the switch that is operated by the expansion or the contraction of the thermic member. In the form of construction shown in Figs. 1 to 4, a means is provided for hydrostatically and positively, that is, without any elasticity, transmitting, and at the same time magnifying, the movement produced by the thermic member of the switch in response to its expansion caused by a lowering of the temperature to a predetermined point, which point, in the operation of devices that are controlled by the switch, is the critical temperature at which it is desired to cause the operation or cessation of operations of the devices that produce the changes in temperature of chambers or bodies and which the thermic switch is intended to control. In refrigerating machines the critical temperature is a temperature that is closely related to the freezing point of water. The critical temperature of any particular machine may be slightly below or it may be slightly above the freezing point of water, and I utilize the expansion and contraction of water that occurs at the freezing point, at which time its expansion or contraction per change in degree is very great, and therefore a marked movement is produced in the surface of the water or ice. If desired alcohol may be added to the water to raise the freezing temperature to a desired point. Also the elements of the thermostatic switch embodying my invention may be set according to the temperature at which this sudden expansion or contraction takes place and according to the results desired to be attained. In the construction shown in Figs. 1 to 4, this noticeable expansion and contraction is transmitted to the movable contact of the switch, to cause either a separation or closing of the contacts and, through an electric current controlled by the contacts, cause the starting or the discontinuance of the operation of suitable electric devices which modify the temperature that effects the thermic body or signals the temperature relation. The means for transmitting the movement caused by the change of condition of the thermic body is moreover of such a character that it will not itself be affected as to its volume by the temperature to which the thermic body is subjected, and, moreover, will not transmit heat either to or from the thermic body and therefore, will not modify the responsive character of the thermic body.

In Figure 1 I have indicated a wall 1 to indicate a separation of the two parts of the thermic switch. Also at 2 is indicated a refrigerant containing the body, such as a tank or pipe or other container suitable for containing any of the well known refrigerants or parts of the chilling apparatus. If desired, the container 2 may be confined in a chamber of a refrigerating machine and the switch may be located on the exterior of the refrigerating machine or in a separate chamber containing parts of the refrigerating machine. The wall as shown in the figure is merely to indicate that the thermic body and the switch are in separate chambers and may be located remote from each other. This is usually the preferred arrangement in order to prevent formation of frost on the parts of the switch which would in many instances prevent the operation of the switch or at least reduce its effectiveness and reliability.

The thermic body is contained in a shell 3 having a heat conductive wall. Preferably the shell is a metal shell and the material contained therein is water 4. In order to slightly lower the temperature at which the water in the shell will freeze a small amount of alcohol may be added which will operate to raise the temperature at which the sudden expansion will take place. The liquid 4 is confined in a chamber having substantially fixed surrounding walls and a flexible wall so that substantially all of the increase in volume of the liquid 4 when it solidifies acts to dilate the flexible wall without producing the dilation of the other wall of the chamber. The reverse action occurs to the same degree when the solid melts to the liquid.

In the form of construction shown in Figs. 1 to 4, inclusive, the shell 3 is divided into two chambers by means of a flexible diaphragm 5, one of the chambers containing the thermic member, namely, the liquid 4 and the other of the chambers contains a liquid 6 having a freezing point much lower than the freezing point of the liquid 4. The liquid 6 will consequently be displaced or moved by the movement of the diaphragm 5 without itself becoming frozen. A pipe 7 communicates with the chamber in which the liquid 6 is located and is filled with the liquid, and, the movement of the diaphragm 5 will be hydrostatically magnified in the movement of the portion of the liquid 6 within the pipe 7. This movement of the liquid in the pipe 7 may be transmitted to the movable member of the switch.

The pipe 7 is connected to the shell located preferably at a point remote from the shell 3 as in a contiguous chamber. The shell 8 is also provided with a flexible diaphragm 9 which may be so connected in the wall of the shell as to divide the shell into two chambers, one of which may contain the liquid 6 and communicates with the pipe 7 and through the pipe 7 with the chamber of the shell 3 containing the liquid 6. The diaphragms are formed of flexible rubber and their edges are sealed in overlapping sealing beads formed in edges of parts of the shells. Thus the movements of the diaphragm 5 is reproduced in the diaphragm 9 and inversely proportional to the relative sizes.

The movements of the diaphragm 9 are transmitted to the pin 10, which extends through the top of the shell and preferably through a suitable clamping nut 11 and sleeve 13. The pin 10 operates the movable member of the switch to close or open the circuit as the case may be. In the form of construction shown the pin 10 has a broad foot 12 that is engaged by the diaphragm 8 and presents a wide area of contact to the diaphragm and consequently a large pressure area for the operation of the pin 10. Thus the pin 10 will be operated notwithstanding the fact that there may be a considerable friction as between the pin 10 and the guiding sleeve 13.

The pin 10 operates upon a spring pressed arm 14 and this in turn operates upon an adjustable screw 15, which is secured in a spring pressed arm 16. The screw 15 may not only adjust the relation between the arms but also will adjust the position of the arm 16 relative to the pin 10 particularly as to the angle formed by the arm 16 with the horizontal. Also the screw 15 may be located in any one of a plurality of holes 17 formed in the arm 16 and consequently the angular movement of the arm 16 may be varied according to which of the holes 17 the screw 15 is located in.

Movement of the arm 16 actuates the movable contact of the switch. In the form of construction shown a mercury switch 21 is supported on the arm 16 by means of an elastic U-member 20. The mercury switch 21 is of the type well known in the art. It has a glass sealed tube 22 in which is located a globule of mercury 23 that is adapted to make contact with the fixed contacts 24. The circuit is closed when the mercury is in contact with both of the contacts and is opened when the mercury is removed from one of the contacts. The movement of the mercury 23, as is well known in connection with such switches, is performed by tilting of the sealed tube 22. The tube is tilted by the angular movement of the arm 16, which is produced by the expansion of the liquid 4 in the shell 3.

The switch is supported on a bracket 30 which is secured in position on the shell 8 by means of the clamping nut 11. The bracket 30 has a part extending rearwardly and is clamped to the top of the shell 8 by the nut 11. A strip 31 is also secured by means of the nut 11 and between the rearwardly extending part of the bracket 30 and the top of the shell. The arm 14 is connected to one end of the strip 31 by a spring 32 and the arm 16 is connected to the other end of the strip 31 by a spring 33. At the top of the bracket may be located suitable terminals 34, which are connected to the contacts by means of the wires 35 and 36, and through the wires 37 to a suitable motor or other device which controls the refrigerant that operates to produce the desired low temperature conditions in the container 2. Thus the liquid 4 which is substantially thermically in contact with the container 2 causes immediate response and a direct and immediate control of any device which is connected in the circuit of the switch.

In the form of construction shown in Fig. 6, the distension of the diaphragm 39 produced by the expansion of the thermic body, namely, the liquid 40, operates directly upon the pin 41 to cause the actuation of the switch. The pin 41 is guided in its movement by means of the sleeve 42, which is clamped in position in the upper part of the shell 43, in which the diaphragm 39 is located. The pin has a broad disc 45 for increasing the contact area with the diaphragm 39. The construction of the switch actuating mechanism is substantially the same as that shown in the form of device illustrated in Figs. 1 to 4. The bracket 30 and the strip 31 are clamped by means of the nut 44 and the sleeve 42 to the top of the shell 43. The arms 14 and 16 are also connected to the ends of the strip 31 by means of the spring 32 and 33 and their relation to each other and, consequently, the position of the arm 16 are adjusted by means of the screw 15. In this form of construction, however, the switch is located in the same chamber that the thermic body is located. The pin 41 which may be greatly lengthened positively transmits the pressure on the diaphragm created by the expansion of the liquid 40 as it freezes.

Where a device is to be controlled under temperature conditions that are relatively considerably higher than the freezing point of water the evaporative point of a liquid may be used or the expansion of a gas may be used. Preferably the former is utilized in order to obtain a greater expansion per degree of change of temperature when the apparatus is to be manipulated to maintain a uniform temperature. A flexible expansion element 48, having a corrugated wall and of the type well known is located within a shell 49. A liquid 50 is located in the shell and so as to completely surround the flexible element. The expansion of the element 48 causes displacement of the liquid 50 and consequently the movement of the liquid may be used for operating the switch part of the device. The container 49 is connected by means of a pipe 51 to a shell, which is constructed substantially the same as the shell 8 of the form of the device shown in Fig. 1. The pipe 51 is filled with the liquid 50 and the expansion of the element 48 causes the liquid in the pipe 51 to pass into the shell 8 and raise the diaphragm 9. This is used to operate the switch in the same manner that the diaphragm 9 operates the switch in the construction shown in Fig. 1. The switch and its supporting and actuating parts are substantially the same as that shown in Fig. 1 wherein the same reference characters refer to the same parts.

In the claims I refer to "change in condition" of the liquid by which I mean the freezing or solidifying or congealing of liquid or the melting or liquefying of the frozen or solidified material.

I claim:

1. In a thermostatic electric switch, a shell having two liquids of different freezing points, a flexible diaphragm for separating the liquids, means actuated by the movements of the diaphragm produced by change in condition of the liquid having the higher freezing point for operating the movable contact of the switch.

2. In a thermostatic electric switch, a shell having a heat conductive wall, a liquid contained in the shell, an elastic diaphragm located in contact with the surface of the liquid, a rod in contact with the diaphragm and a switch operated by movement of the rod produced by the movement of the diaphragm upon the freezing of and melting to the liquid.

3. In a thermostatic electric switch, a shell having two liquids of different freezing temperatures, a flexible diaphragm for separating the liquids, a second shell, a tube for connecting the shells and communicating with the portion of the first named shell having the liquid whose freezing point is the lower, a second diaphragm located in the second named shell and in contact with the surface of the last named liquid, means operated by the spherical distension and contraction of the second named diaphragm for moving the movable member of the switch.

4. In a thermic switch, a container, a shell and a tube for connecting the shell to the container, a liquid contained in the shell, the tube and the container, a diaphragm located in the shell and in contact with the surface of the liquid, a thermic expansive element located in the liquid in the container, means for moving the movable member of the switch by the movement of the diaphragm.

In testimony whereof I have hereunto signed my name to this specification.

ESTEL C. RANEY.